Figure 1:
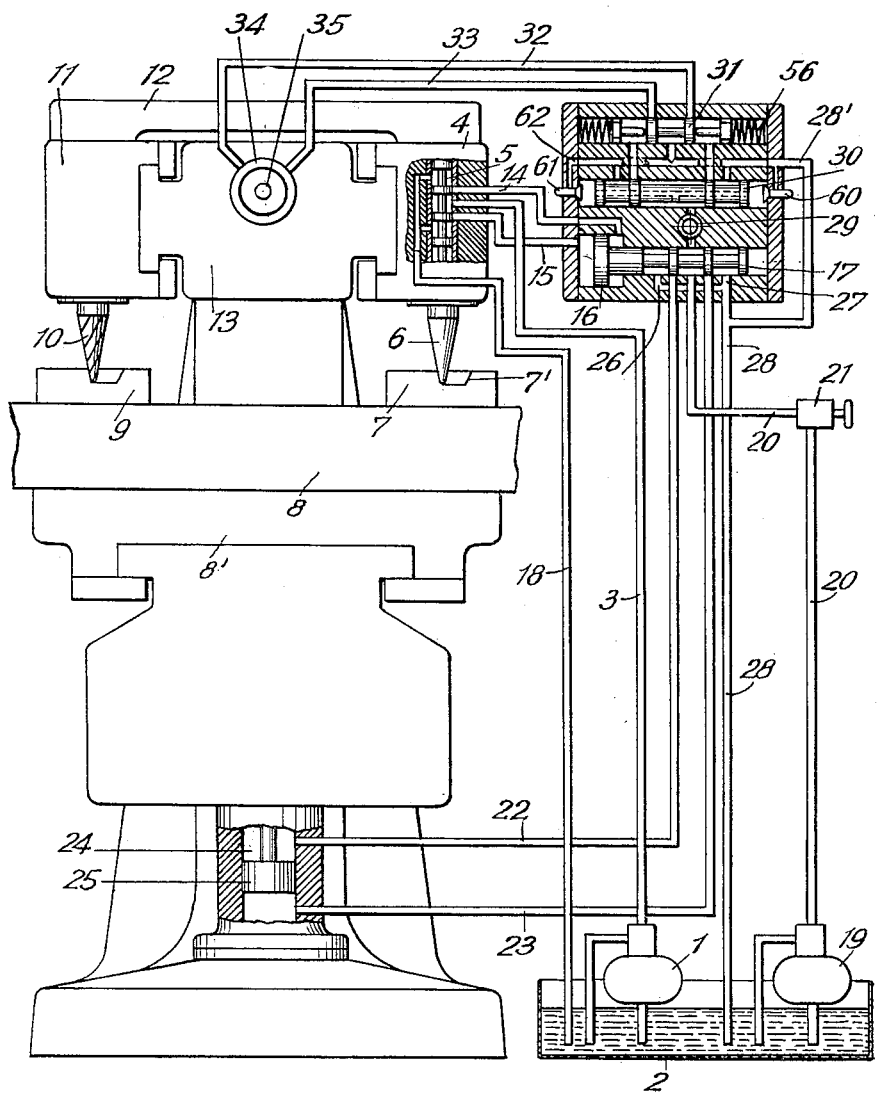

Feb. 21, 1956 R. GLASER 2,735,342
SERVOMOTOR CONTROL SYSTEM FOR COPYING MACHINE TOOLS
Filed March 10, 1949 4 Sheets-Sheet 1

INVENTOR:
Rolf Glaser
by Sommers & Young
Attorneys

Feb. 21, 1956     R. GLASER     2,735,342
SERVOMOTOR CONTROL SYSTEM FOR COPYING MACHINE TOOLS
Filed March 10, 1949     4 Sheets—Sheet 3
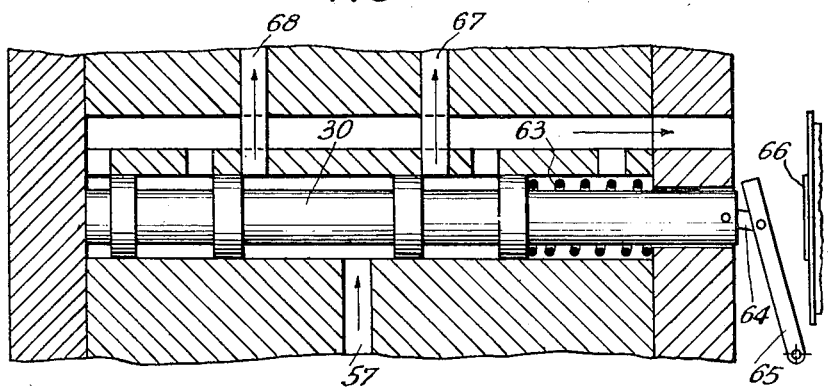
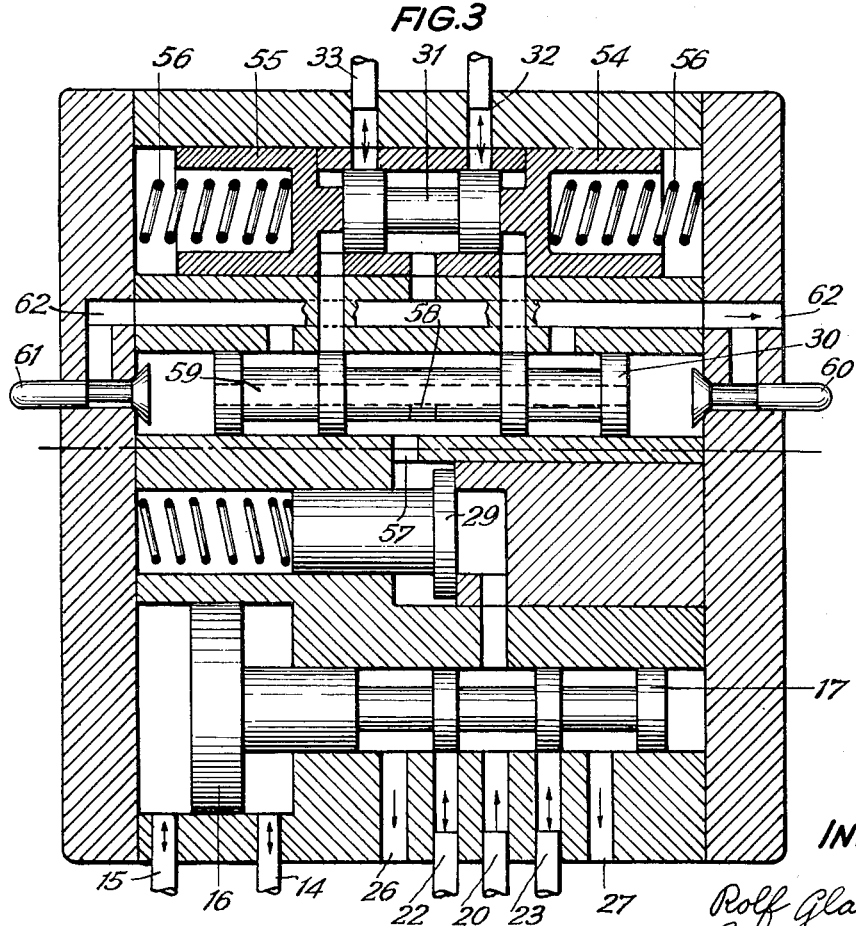

United States Patent Office 2,735,342
Patented Feb. 21, 1956

2,735,342

SERVOMOTOR CONTROL SYSTEM FOR COPYING MACHINE TOOLS

Rolf Glaser, Rorschach, Switzerland, assignor to Rigid Limited, Rorschacherberg, Switzerland Application March 10, 1949, Serial No. 80,661

Claims priority, application Switzerland March 12, 1948

1 Claim. (Cl. 90—62)

My present invention relates to a fluid-pressure servomotor control system for copying machine tools having at least one working piston which is biasable from a tracer through the pressure fluid and is connected to the tool carrier or work carrier.

Servomotor control systems of the type indicated have the disadvantage that, when the tracer on steep contours of the pattern is laterally loaded to a certain extent a valve associated with said feeler no longer responds, thus giving rise to a lost motion which only may be surmounted through additional movements of the tracer. The delays brought about thereby in the control movement give origin to corresponding inaccuracies in the copying operation.

To eliminate such disadvantage, the servomotor control system according to my present invention comprises a liquid-control slide valve which is biasable from the tracer and arranged in a control sleeve valve. The latter is operatively connected to the tracer so that the said sleeve valve, at a certain lateral pressure against the tracer, is so displaced as to assume or perform the function of the said valve. The control valve is connected to the feed motor to govern its speed in relation to the steepness of the pattern being traced.

In this manner, the run of the liquid may be controlled positively, that is, free of delays, through the tracer, also from steep contour portions, thus permitting an accurate copying operation.

Suitably a regulating valve is provided which is biasable from the liquid control slide valve through a third valve, for the purpose of controlling a second working piston.

Two forms of my present invention are shown in the drawings, in which

Figure 2:
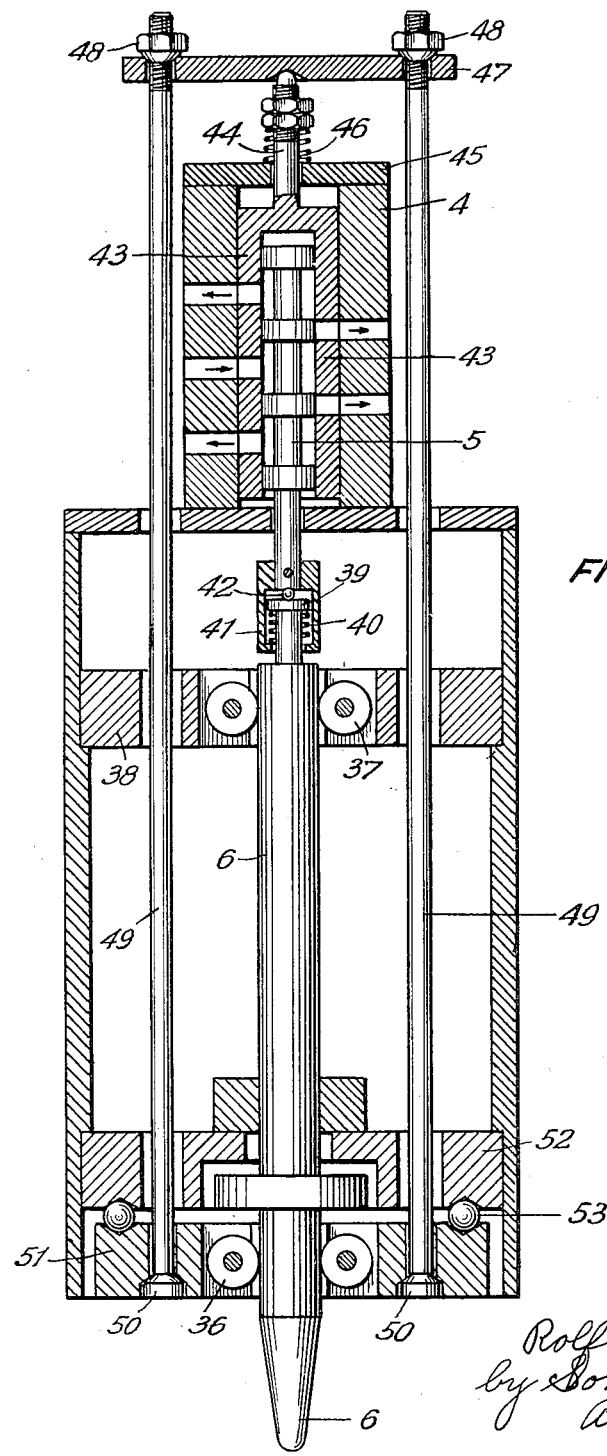
Figure 5:
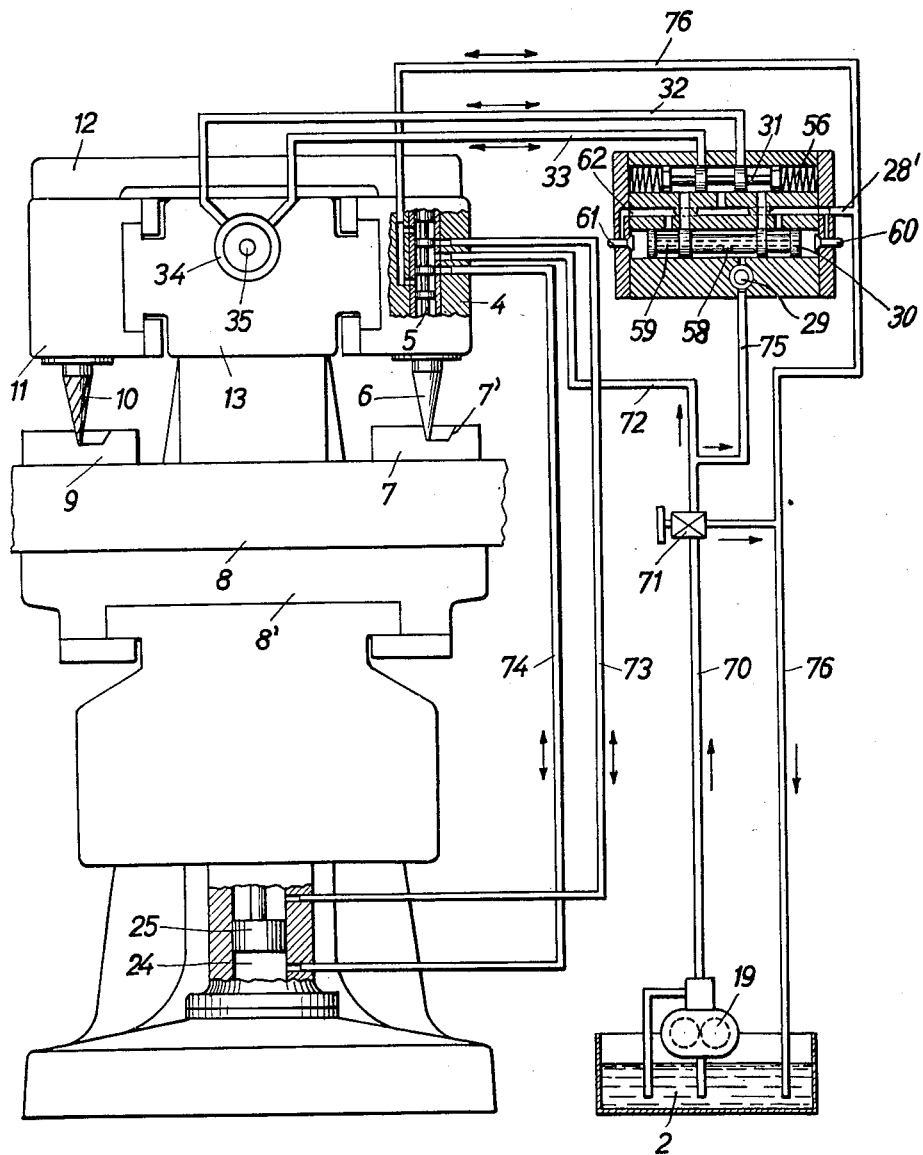

Fig. 1 shows, as a first example, and partly schematically a copy milling machine in elevation, Fig. 2 illustrates in a larger scale an axial section of the means connecting the tracer to the control valve, Fig. 3, in a larger scale, a longitudinal section through the valve system, Fig. 4, in a partial drawing similar to Fig. 3, a modified slide valve, and Fig. 5 the second example in a drawing corresponding to Fig. 1.

In the first example and in Fig. 1, the low-pressure pump 1 associated with the copy milling machine supplies pressure liquid from the tank 2 through the line 3 to the control or operating valve 5 disposed in the control box 4. The said valve is moved through tracer 6 which in known manner co-acts with the pattern 7 clamped to the work table 8. The latter is mounted on the machine column through a carriage 8' and carries the work 9 which is to be machined by the milling cutter 10 in accordance with the pattern 7. The cutter 10 is disposed on the casing 11 which is fixed to the control box 4 through a crossbar 12, thereby forming a corresponding translatory structure on a carrier 13 provided on the machine column.

According to the vertical movement of the tracer 6 and thus according to the resulting adjustment or setting of operating valve 5, the pressure liquid is fed from control box 4 through the line 14 or 15 to a piston 16 in order to engage the latter from one side or the other. The main slide valve 17, which is fixed to piston 16, thus is correspondingly controlled. A pressure liquid return line 18 connects the guide chamber of valve 5 to the supply tank 2.

A high-pressure pump 19 serves for feeding pressure liquid from tank 2 through a line 20, in which is connected a throttle 21, into the guide chamber of the main valve 17. The said guide chamber communicates with the vertically disposed cylinder 24 through two lines 22 and 23, in which cylinder the piston 25 for the vertical working stroke of tool 11 is disposed. When the main valve 17 occupies a certain position, the pressure fluid arriving from line 20 is supplied from the guide chamber of valve 17 to the cylinder 24 through the line 22 or 23 so as to move the piston 25, which is connected with the work table 8 vertically in one or the other direction. The pressure liquid may flow back into tank 2 from the guide chamber of the main valve 17 through two ducts 26 and 27 which communicate with a common return line 28. The said guide chamber through a crossbore communicates with a space in which a spring loaded valve 29 is disposed (see also Fig. 3). The said said space communicates through a second crossbore with the guide chamber of a reversing valve 30 which is disposed parallel to main valve 17.

When the main valve 17 is in the intermediate position, as shown in Figs. 1 and 3, or is only partly opened, the pressure liquid builds up pressure in the guide space thereof, arriving therein through the line 20 in metered quantity from throttle 21. The valve 29 then is opened against the action of its spring so that the pressure liquid flows into the central chamber of a reversing slide valve 30, from which it arrives, according to the position of the latter, on one side or the other of a spring loaded regulating valve 31 which is disposed parallel to the valves 17 and 30. The said valve 31 then is opened just so far that the control liquid flows under the desired pressure either through the line 32 or 33 to the horizontal feed cylinder 34 provided in the carrier 13. The piston 35 disposed in cylinder 34 transmits the horizontal working stroke to the structure 4, 11 and 12, being moved forward or backward according to which side of the piston the pressure liquid flows. The pressure liquid then flows through the line 32 or 33 and the return line 28 back into the tank 2. According to the shape of pattern 7, the two working pistons 25 and 35 move either simultaneously or singly.

The tracer 6 is axially displaceable on lower and upper guide rollers 36 and 37 respectively, as shown in Fig. 2. The rollers 37 are mounted on a stationary plate 38. The tracer 6 at its upper end is, resiliently and within certain limits articulatedly connected to the lower end of control valve 5 through a head 39, pressure spring 40, sleeve 41 and ball 42. The control valve 5 is disposed in a control sleeve 43 provided in the box 4. The control sleeve 43 comprises a central upper stem 44 which is acted on by a pressure spring 46 abutting against a fixed yoke 45, whereby the stem 44 is held in a recess of an abutment 47 through its semispherical end. A plurality of tie rods 49 are connected at one end to the abutment 47 through nuts 48 which have spherical seats therein, and at the other end are engaged to a hanger plate 51 through heads 50 which also have spherical seats in plate 51. In the latter are journaled the lower guide rollers 36 of pin 6. The hanger plate 51, thus, is oscillatably suspended through the tie rods 49. A series of ball abutments 53 are disposed intermediate the hanger plate 51 and a fixed retainer plate 52 in seats provided in the two said plates.

When in the sense of Fig. 1, during operation of the machine, the tracer 6 is laterally displaced from its vertical position due to being engaged on correspondingly steep contour portions 7' on pattern 7, the hanger plate 51 is adjusted in position through the lower guide rollers 36 of the tracer 6 in a crosswise direction, that is, in its own plane. The balls 53 thus are displaced in their seats provided on the retainer plate 52, whereby the plate 51 is depressed relative to the fixed plate 52. The hanger plate 51, moving downwardly, causes a downward displacement of the abutment 47 through the tie rods 49. Finally, the control sleeve valve 43 is axially depressed through the stem 44 so as to assume the function of valve 5.

As shown in Fig. 3, the regulating valve 31 is disposed between two sleeves 54 and 55 loaded by springs 56 which tend to hold the valve 31 in the intermediate position shown.

Pressure-liquid is fed by pump 19 (Fig. 1) from tank 2 through line 20 and throttle 21 to the guide space of the main valve 17 which is adjusted through its piston 16 from the control valve 5. The pressurized liquid then flows through line 22 or 23 into cylinder 24 and otherwise through the ducts 26 and 27 into the return line 28 back into tank 2. When the main valve 17 is in the intermediate position or is only partly opened, the valve 29 is opened under liquid-pressure as mentioned above, so that the excess liquid flows through the crossbore 57 to the reversing valve 30. The latter in its central portion has a radial bore 58 which opens into a continuous longitudinal bore 59 so that pressure liquid flows onto the two endfaces of valve 30. A bevel valve 60 and 61 respectively, is associated with each of the two terminal chambers of the guide chamber containing the reversing valve 30, which valve in the closed position projects with its stem from the respective casing side. When one of the two valves 60, 61 is opened from the outside, for example, through being engaged by an associated stop or abutment which preferably is adjustable, pressurized liquid will flow from the respective terminal chamber and the pressure drops in the latter. Such latter liquid flows through a bore 62 and a branch line 28' (Fig. 1) opening into the return line 28, back into the tank 2. The said stops or abutments serve to reverse the movement of piston 35 (Fig. 1) provided for the horizontal working stroke, by means of valve 30. The latter is displaced toward the opened valve 60 or 61, thus reversing the flow of pressurized liquid to the reversing valve 31 and controlling the run of pressurized liquid to the feed cylinder 34 of working piston 35, either by way of line 32 or 33. Before, however, the pressurized liquid becomes active in the feed cylinder 34, it has to overcome the force of the compression spring 56 acting on sleeve 54 or 55. Only narrow or constricted openings thus are provided for passing the pressurized liquid into the connecting lines 32 and 33, thereby affording a certain counterpressure against the pressure acting onto the working face of piston 35, which arrangement produces a quiet operation.

As the control valve 5 (Fig. 2) is subjected to a comparatively low liquid pressure, the tracer 6 operates under slight pressure only so as to be quickly responsive. Such arrangement, therefore, affords a constant linear feed and an accurate machining in cooperation with the liquid-run control means described. The pressurized liquid is fed uniformly to the two working pistons when the generatrix has a slope of 45° for example; while at a slope of 30° for example, approximately one third and two thirds of the mass flow respectively is fed to the piston for executing the vertical and horizontal working stroke respectively. The cutting width may be mechanically adjusted in a continuous or stepwise manner by means of a time switch through motor means, or such adjustment may be brought about hydraulically or mechanically through the reversing movement.

As shown in Fig. 4, the reversing valve 30, which is acted on by the spring 63, is hingedly connected through a link 64 to the armature 65 of an electromagnet 66. The bores 67, 68 communicating with the guide chamber of the reversing valve 30 open into the guide chamber (not shown) of the regulating valve. On closing the circuit of electromagnet 66, the latter is excited and the armature 64 attracted, whereby the valve 30 is axially displaced against the action of spring 63 for the purpose of changing the flow path of the liquid. On breaking the said circuit, the valve 30 is axially displaced through the action of spring 63 in the direction opposite to that of the previous displacement for the purpose of again changing the flow path of the liquid.

The machine tool, of course, also may be so adapted as to permit to perform the copying operation in any transmission ratio desired.

The hydraulic control according to my present invention also may be used when the respective machine tool comprises only one hydraulically controlled working piston or more than two such pistons.

A particularly simple hydraulic control is shown in Fig. 5 in which the control valve 5 is so disposed that at least one working piston is biasable through the pressurized liquid directly from said valve.

In Fig. 5, the high pressure pump 19 associated with the copy milling machine serves for feeding the pressurized liquid from tank 2 through line 70, throttle 71 and branch line 72 to the control valve 5 disposed in control box 4. The valve 5 is constructed as disclosed in connection with the first example shown in Figs. 1–4, and is also actuated through the tracer 6.

According to the vertical movement of pin 6 and the resulting adjustment of valve 5, the pressurized liquid is fed through line 73 or 74 into cylinder 24 for the purpose of raising or lowering the piston 25.

When, as in Fig. 5, the valve 5 is in the intermediate position or only partly opened, the pressurized liquid builds up pressure in the central portion of the guide chamber of valve 5, arriving under a relatively high pressure, through the line 72 from line 70 and throttle 71. Owing to such excess pressure, which also acts in the branch line 75 of line 72, the valve 29 associated with line 75 is opened against the action of its spring so that the pressurized liquid flows to the reversing valve 30 and then engages the spring loaded regulating valve 31 from one side or the other according to the position of valve 31. The latter thus is opened just so far that the liquid flows under the desired pressure through one of the two lines 32, 33 to the horizontal feed cylinder 34, whereby the piston 35 in the latter is moved backward or forward according to which side thereof the pressurized liquid flows. The latter subsequently is returned through the line 33 or 32 to the tank 2.

When one of the two bevel valves 60, 61 associated with the reversing valve 30 is opened from outside, pressurized liquid flows from the respective terminal chamber, while the pressure drops in the latter, and is returned to tank 2 through duct 62 and a branch line 28' connected to the return line 76.

What I claim as new and desire to secure by Letters Patent, is:

In a fluid pressure servo-motor control system for at least one pressurized liquid controlled working piston, a cylinder having inlet and outlet ports for said pressurized liquid, a control sleeve axially slidable in said cylinder to control said ports, said control sleeve having inlet and outlet ports registering with the ports in said cylinder, a slide valve in said sleeve to control the ports in said sleeve, an axially and transversely movable tracer in alignment with and connected to said slide valve to move said slide valve axially on an axial displacement of said tracer, an oscillatory suspended plate on which said tracer is mounted, means coacting with said plate to transform transverse movement of said tracer into axial movement of said plate, and means connecting said plate with said sleeve for axial movement only upon transverse movement of said tracer.

References Cited in the file of this patent

UNITED STATES PATENTS

| | | |
|---|---|---|
| 1,084,155 | Lochman | Jan. 13, 1914 |
| 1,506,454 | Shaw | Aug. 26, 1926 |
| 1,943,061 | Douglas | Jan. 9, 1934 |
| 2,003,557 | Sassen | June 4, 1935 |
| 2,120,196 | Wright | June 7, 1938 |
| 2,190,988 | Johansen | Feb. 20, 1940 |
| 2,199,465 | Martellotti | May 7, 1940 |
| 2,331,817 | Turchan | Oct. 12, 1943 |
| 2,365,471 | Ingres | Dec. 19, 1944 |
| 2,391,492 | Turchan | Dec. 25, 1945 |
| 2,407,097 | Porter | Sept. 3, 1946 |
| 2,618,244 | Roehm | Nov. 18, 1952 |